(12) United States Patent
Martin et al.

(10) Patent No.: US 11,464,180 B2
(45) Date of Patent: Oct. 11, 2022

(54) VERTICAL AEROPONIC PLANT GROWING ENCLOSURE

(71) Applicant: INNOVATION AGRI-TECH GROUP LTD., London (GB)

(72) Inventors: David W. Martin, Las Vegas, NV (US); Ronald R. Evans, Las Vegas, NV (US)

(73) Assignee: INNOVATION AGRI-TECH GROUP LTD., Mayfair (GB)

( * ) Notice: Subject to any disclaimer, the term of this patent is extended or adjusted under 35 U.S.C. 154(b) by 290 days.

(21) Appl. No.: 15/707,574

(22) Filed: Sep. 18, 2017

(65) Prior Publication Data
US 2018/0000029 A1    Jan. 4, 2018

Related U.S. Application Data

(63) Continuation-in-part of application No. 15/168,960, filed on May 31, 2016, now Pat. No. 9,788,495, which is a continuation of application No. 14/814,103, filed on Jul. 30, 2015, now Pat. No. 9,374,953, which is a continuation-in-part of application No. 14/712,247, filed on May 14, 2015, now Pat. No. 9,241,453, and a continuation-in-part of application No. PCT/US2015/042938, filed on Jul.
(Continued)

(51) Int. Cl.
*A01G 31/02* (2006.01)
*A01G 27/00* (2006.01)
*A01G 31/06* (2006.01)

(52) U.S. Cl.
CPC .......... *A01G 31/02* (2013.01); *A01G 27/008* (2013.01); *A01G 31/06* (2013.01); *Y02P 60/21* (2015.11)

(58) Field of Classification Search
USPC ..... 47/64, 62 R, 59 R, 62 A, 62 E, 62 C, 63, 47/83, 79, 65.5, 65, 65.9, 66.5, 86; 52/792.1, 800.1, 459, 461, 465, 463, 468, 52/784.12, 784.13, 784.16, 791.1, 799.1, 52/802.1, 656.1
See application file for complete search history.

(56) References Cited

U.S. PATENT DOCUMENTS 2,240,487 A * 5/1941 Benham .................. E04C 2/292
                                                    52/792.1
4,468,885 A * 9/1984 Mandish ................ A01G 31/02
                                                    47/59 R
(Continued)

*Primary Examiner* — Andrea M Valenti
(74) *Attorney, Agent, or Firm* — Barnes & Thornburg LLP

(57) ABSTRACT

A grow plant enclosure to maximize plant density for a given growing area has a perimeter frame, a first pane, and a second pane. The first pane and the second pane are removably attached to the perimeter frame about opposite sides to form a hollow enclosure. A plurality of plug holder openings traverses through the first pane and the second pane, wherein each of the plug holder openings is designed to receive one of a plurality of plant holders for growing various plant types. A plurality of supply tubes traverse into the perimeter frame through a plurality of supply tube openings and each has a plurality of spray nozzles to deliver nutrient solution to the root zone of the plants retained in the plurality of plant holders. Excess nutrient solution is released through a drain tray and a drain fixture positioned about the bottom of the perimeter frame.

16 Claims, 23 Drawing Sheets

Related U.S. Application Data 30, 2015, which is a continuation-in-part of application No. 14/712,247, filed on May 14, 2015, now Pat. No. 9,241,453.

(60) Provisional application No. 62/030,944, filed on Jul. 30, 2014, provisional application No. 62/030,950, filed on Jul. 30, 2014, provisional application No. 62/031,177, filed on Jul. 31, 2014, provisional application No. 62/032,437, filed on Aug. 1, 2014, provisional application No. 62/032,442, filed on Aug. 1, 2014.

(56) References Cited

U.S. PATENT DOCUMENTS

| | | | | |
|---|---|---|---|---|
| 6,021,602 | A * | 2/2000 | Orsi | A01G 31/02 47/62 A |
| 8,505,238 | B2 * | 8/2013 | Luebbers | A01G 31/02 47/62 A |
| 8,578,651 | B1 * | 11/2013 | Giacomantonio | A01G 31/02 47/62 A |
| 8,966,819 | B1 * | 3/2015 | Cosmann | A01G 9/023 47/83 |
| 9,814,186 | B2 * | 11/2017 | Anderson | A01G 31/02 |
| 10,694,684 | B2 * | 6/2020 | Jarvinen | A01G 9/025 |
| 2009/0100760 | A1 * | 4/2009 | Ewing | E05D 15/08 49/410 |
| 2010/0024292 | A1 * | 2/2010 | Kertz | A01G 9/024 47/17 |
| 2010/0146855 | A1 * | 6/2010 | Ma | A01G 9/025 47/82 |
| 2011/0258925 | A1 * | 10/2011 | Baker | A01G 9/023 47/65.8 |
| 2012/0066972 | A1 * | 3/2012 | Lin | A01G 9/024 47/82 |
| 2013/0180172 | A1 * | 7/2013 | Silverberg | A01G 9/022 47/65 |
| 2014/0144079 | A1 * | 5/2014 | Lin | A01G 9/249 47/62 R |
| 2015/0345152 | A1 * | 12/2015 | Libreiro | E04F 13/0891 52/506.05 |
| 2016/0066525 | A1 * | 3/2016 | Duquesnay | A01G 31/06 47/62 R |

\* cited by examiner

SECTION A-A

VERTICAL AEROPONIC PLANT GROWING ENCLOSURE

The current application is a continuation in part of U.S. patent application Ser. No. 15/168,960 filed on May 31, 2016 which is a continuation of U.S. patent application Ser. No. 14/814,103 filed Jul. 30, 2015.

U.S. patent application Ser. No. 14/814,103 filed Jul. 30, 2015 claims benefit of U.S. Provisional Patent Application 62/030,944 filed Jul. 30, 2014, U.S. Provisional Patent Application 62/030,950 filed Jul. 30, 2014, U.S. Provisional Patent Application 62/031,177 filed Jul. 31, 2014, U.S. Provisional Patent Application 62/032,437 filed Aug. 1, 2014, and U.S. Provisional Patent Application 62/032,442 filed Aug. 1, 2014. U.S. patent application Ser. No. 14/814,103 filed Jul. 30, 2015 is a continuation in part of U.S. patent application Ser. No. 14/712,247 filed May 14, 2015 and a continuation in part of PCT patent application PCT/US 15/42938 filed Jul. 30, 2015.

PCT patent application PCT/US 15/42938 filed Jul. 30, 2015 claims benefit of U.S. Provisional Patent Application 62/030,944 filed Jul. 30, 2014, U.S. Provisional Patent Application 62/030,950 filed Jul. 30, 2014, U.S. Provisional Patent Application 62/031,177 filed Jul. 31, 2014, U.S. Provisional Patent Application 62/032,437 filed Aug. 1, 2014, and U.S. Provisional Patent Application 62/032,442 filed Aug. 1, 2014. PCT patent application PCT/US 15/42938 filed Jul. 30, 2015 is a continuation in part of U.S. patent application Ser. No. 14/712,247 filed May 14, 2015.

U.S. patent application Ser. No. 14/712,247 filed May 14, 2015 claims benefit of provisional U.S. Provisional Patent Application 62/030,944 filed Jul. 30, 2014, U.S. Provisional Patent Application 62/031,177 filed Jul. 31, 2014, U.S. Provisional Patent Application 62/032,437 filed Aug. 1, 2014, and U.S. Provisional Patent Application 62/032,442 filed Aug. 1, 2014.

FIELD OF THE INVENTION

The present invention relates generally to aeroponic growth structures for commercial vegetable cultivation, stem/vining fruit cultivation, and horticultural plant cultivation. More specifically, the present invention is a grow panel enclosure for implementing such plant cultivation in a high-density vertical or horizontal growing configuration.

BACKGROUND OF THE INVENTION

The agricultural industry is undergoing advancements in growing methodology and technology, in both the indoor and outdoor areas of farming and crop production. The concept of growing more plants in a healthy fashion in increasingly smaller amounts of space, both vertically and horizontally, is seeing growing importance commercially. Further, the commercial cultivation of plants using hydroponic, aquaponic, and aeroponic methods is well known and established, and as the development of growing such plants in smaller spaces continues, there is a need for improved physical means of growing plants in these smaller spaces while providing the plants with precisely controlled, favorable levels of nutrients, water, light and air to provide for a healthy, robust plant growth from these methods.

Prior designs of devices for such vertical and/or horizontal growing configurations have substantial disadvantages in the specific area of creating maximum functional and practical plant density in the allotted growing space; as well as in the practical manner of planting and harvesting of plants, and in the area of containing and/or reducing costs of operations specifically in the areas of labor costs and material costs to perform and achieve the same or similar levels of plant production and/or yield.

Existing designs of devices and systems prior to the present invention for vertically positioned plant cultivation using aeroponics, hydroponics, and/or aquaponics all generally have in place common functional methods for the storage of liquid nutrient solution, and the delivery of liquid nutrient solution, and the return of excess or a portion thereof of said nutrient solution to a common reservoir, most particularly in a re-circulating system, and such designs are well known.

These common design functions also may provide for the aeration of the nutrient solution for the delivery of proper oxygen supply to the root systems of the plants under cultivation, and such designs are well known.

Prior designs of vertical devices which house the plants for their life cycle period of growth from sprouted stage to harvesting stage have distinct disadvantages in the areas of functionality from a commercial point of view, operational costs, ease of use, elimination of potential heavy lifting in daily operation of the device, and in the area of plant density for any given growing space allotted.

Therefore it is an object of the present invention to provide a grow panel enclosure that maximizes plant density for a given growing area and streamlines operational functions for ease of use by an operator. Further objects of the present invention include elimination of the above referenced disadvantages, specifically, it exists in the improvement by way of a reduction in labor and time required to plant sprouted plants in the device and a reduction in time required to harvest mature plants which are ready for removal so the next cycle of plants can be put in place, without movement or disassembly of the vertical or horizontal growing enclosure unit. The grow panel enclosure is for vertical or horizontal plant cultivation and provides improvements in all areas discussed above and provides operational cost reductions along with increased plant production capacity and overall yield capacity, particularly from the qualified point of view of commercial producers.

Further, the invention will help in the reduction of costs associated with consumable materials used in the cultivation process including the elimination of the use of net pots, a commonly used plastic container which holds sprouted and growing plants during their life cycle in a soil-less or reduced-soil cultivation environment. The invention allows for generally higher sustainable and realistic plant growing densities in a vertical or horizontal configuration, in an easily operated manner, and is thus capable of lowering overall operating costs associated with a given plant yield of plants when compared to other known devices which feature lower plant densities incumbent to their respective design(s) and amount of area attributable to such devices. This means this device will allow for, in a comparable controlled growing space, with comparable indicated elements of the cultivation of plants, including acceptable application of, but not limited to, nutrients, water, light, oxygen and carbon dioxide; a higher profit to the commercial grower/producer through higher yields of plants in a similar space horizontally and vertically, all comparable factors essential to such yields being held the same or similar, such as but perhaps not limited to: available and proper spectrum of light for photosynthesis, nutrient levels available at the plant root zone, oxygen levels to the plant root zone, carbon dioxide levels in the atmosphere surrounding the plants under cultivation, atmospheric air temperature, atmospheric air humidity levels, and atmospheric air circulation in the growing environment.

DETAIL DESCRIPTIONS OF THE INVENTION

Figure 1:
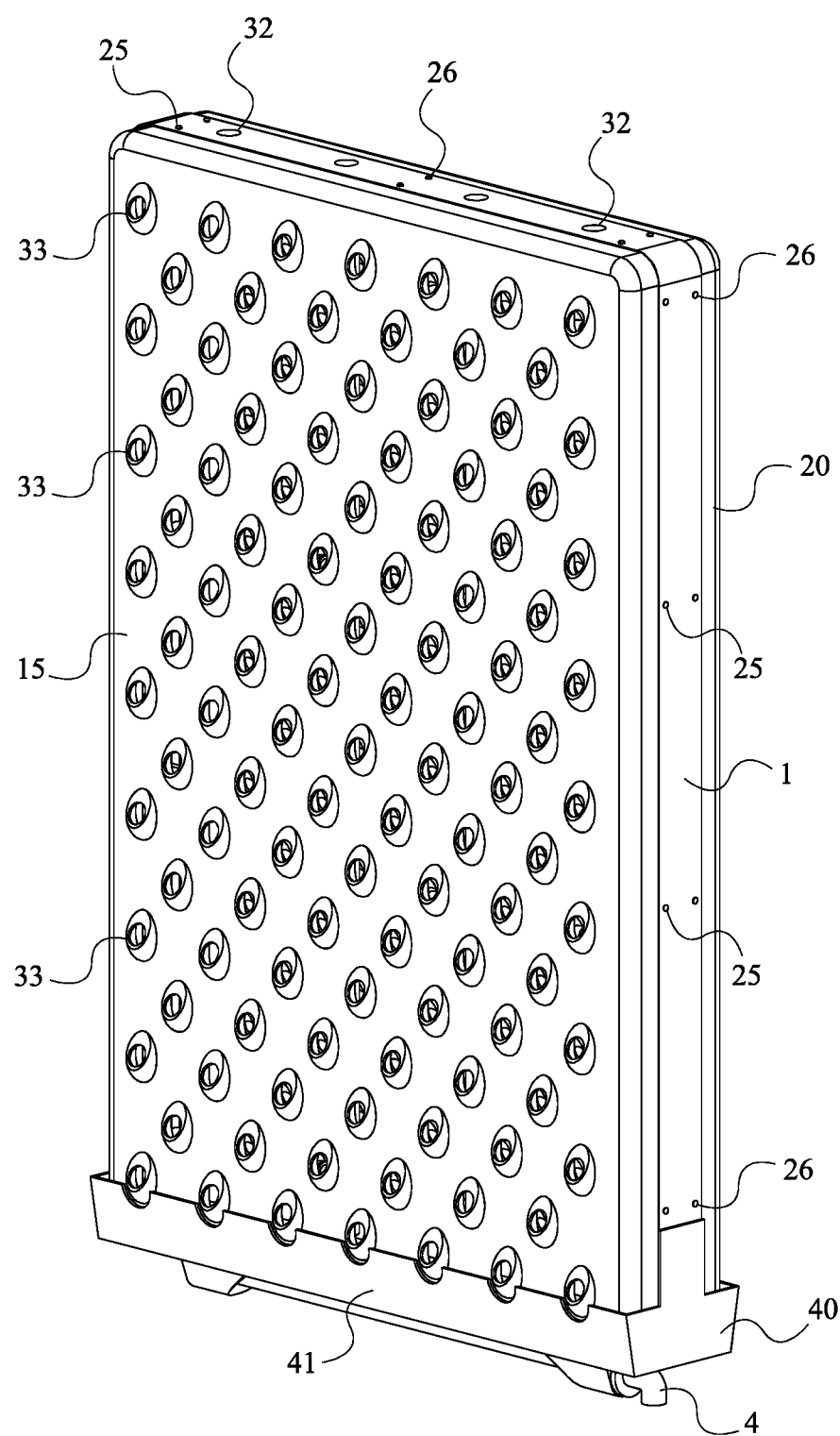
FIG. 1 is a perspective view of the present invention in the preferred embodiment.

All illustrations of the drawings are for the purpose of describing selected versions of the present invention and are not intended to limit the scope of the present invention.

The present invention is a grow panel enclosure to maximize plant density for a given growing area. The present invention allows for generally higher sustainable and realistic plant growing densities in a vertical or horizontal configuration, and does so in an easily operated manner. Thus, the present invention is capable of lowering overall operating costs associated with a given yield of plants when compared to other known devices which feature lower plant densities incumbent to their respective design(s) and amount of area attributable to such devices.

The grow panel enclosure comprises a perimeter frame 1, a first pane 15, a second pane 20, a plurality of plug holder openings 30, a drain fixture 4, and a one or more panel hangers 5. Together, the perimeter frame 1, the first pane 15, and the second pane 20 form an enclosed structure that can be positioned either vertically or horizontally to support the desired plants. In the preferred embodiment of the present invention, the perimeter frame 1, the first pane 15, and the second pane 20 are rectangular in shape, however, in other embodiments of the present invention a different shape may be formed.

Figure 7:
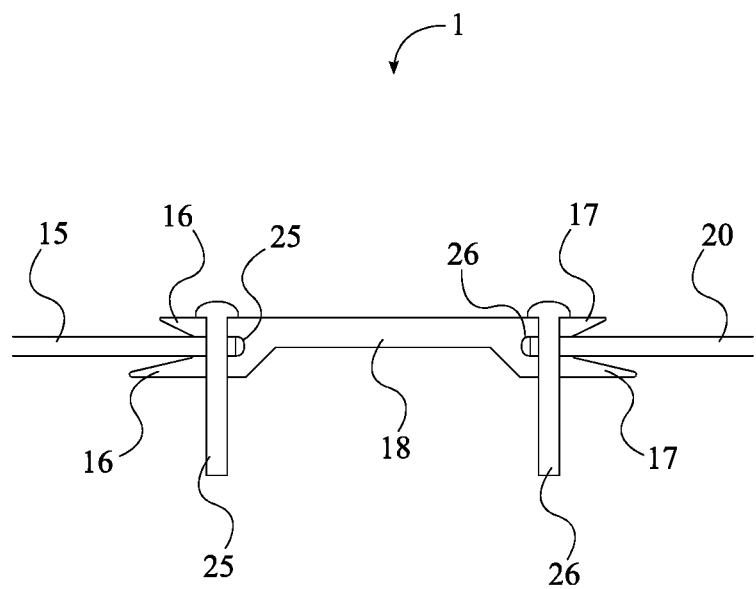
FIG. 7 is a cross sectional view of the first pane being slotted into the first channel and the second pane being slotted into the second channel.

In reference to FIG. 7, in one embodiment, the perimeter frame 1 comprises a first pair of flanges 16, a second pair of flanges 17, and a mid-section 18. A left side wall, a top wall, and a right side wall of the perimeter frame 1 form a U-shaped structure; the left side wall and the right side wall being perpendicular to and longer than the top wall. The first pair of flanges 16 and the second pair of flanges 17 are adjacently connected along the mid-section 18, wherein the first pair of flanges 16 and the second pair of flanges 17 are positioned opposite each other across the mid-section 18. The first pair of flanges 16 forms a first channel 23 that traverses along the mid-section 18, while the second pair of flanges 17 forms a second channel 24 that traverses along the mid-section 18.

In further reference to FIG. 7, the first channel 23 and the second channel 24 provide a means for receiving the first pane 15 and the second pane 20 respectively. Both the first pane 15 and the second pane 20 are thin walled structures that form a hollow shell when attached to the perimeter frame 1. The first pane 15 is slotted into the first channel 23, while the second pane 20 is slotted into the second channel 24. Preferably, both the first pane 15 and the second pane 20 engage the perimeter frame 1 to form a watertight seal between the perimeter frame 1 and both the first pane 15 and the second pane 20. In order to secure the first pane 15 and the second pane 20 to the perimeter frame 1, a first plurality of pins 25 and a second plurality of pins 26 are employed. Each of the first plurality of pins 25 traverses through the first pair of flanges 16 and the first pane 15, while each of the second plurality of pins 26 traverses through the second pair of flanges 17 and the second pane 20.

To facilitate the attachment of the first pane 15 and the second pane 20 to the perimeter frame 1, each of the first pane 15, the second pane 20, the first pair of flanges 16, and the second pair of flanges 17 includes a plurality of holes. The plurality of holes of the first pane 15 is positioned along the edge of the first pane 15 that engages with the first pair of flanges 16, such that the plurality of holes of the first pane 15 is aligned with the plurality of hole of the first pair of flanges 16. In this way, each of the plurality of first pins 25 traverses through one of the plurality of holes of the first pane 15 and a corresponding pair of holes from the plurality of holes of the first pair of flanges 16.

Similarly, the plurality of holes of the second pane 20 is positioned along the edge of the second pane 20 that engages with the second pair of flanges 17, such that the plurality of holes of the second pane 20 is aligned with the plurality of hole of the second pair of flanges 17. In this way, each of the plurality of second pins 26 traverses through one of the plurality of holes of the second pane 20 and a corresponding pair of holes from the plurality of holes of the second pair of flanges 17.

In one embodiment, each of the first plurality of pins 25 and each of the second plurality of pins 26 is a snap lock pin such that the first pane 15 and the second pane 20 are securely held in place, yet each of the first plurality of pins 25 and each of the second plurality of pins 26 is readily removable, allowing the first pane 15 and the second pane 20, respectively, to be detached from the perimeter frame 1. Preferably, each of the first plurality of pins 25 and each of the second plurality of pins 26 is constructed from nylon, however, other materials may be used. In other embodiments, different means of connection may be used to interlock the first pane 1 and the second pane 20 with the perimeter frame 1, such as screws, snaps, latches, etc.

In reference to FIG. 1, in some embodiments, the present invention further comprises a drain tray. The drain tray 40 is terminally connected to the perimeter frame 1, opposite the top wall. Each of the first pane 15, the second pane 20, and the perimeter frame 1 is positioned into the drain tray 40. In this way, any water, or other liquid, sprayed within the enclosure formed by the first pane 15, the second pane 20, and the perimeter frame 1 is collected in the drain tray 40, through the open end of the perimeter frame 1. The drain tray 40 comprises a first lateral wall 41 and a second lateral wall 42, wherein the first lateral wall 41 and the second lateral wall 42 are positioned along the bottom of the first pane 15 and the second pane 20 respectively.

Figure 4:
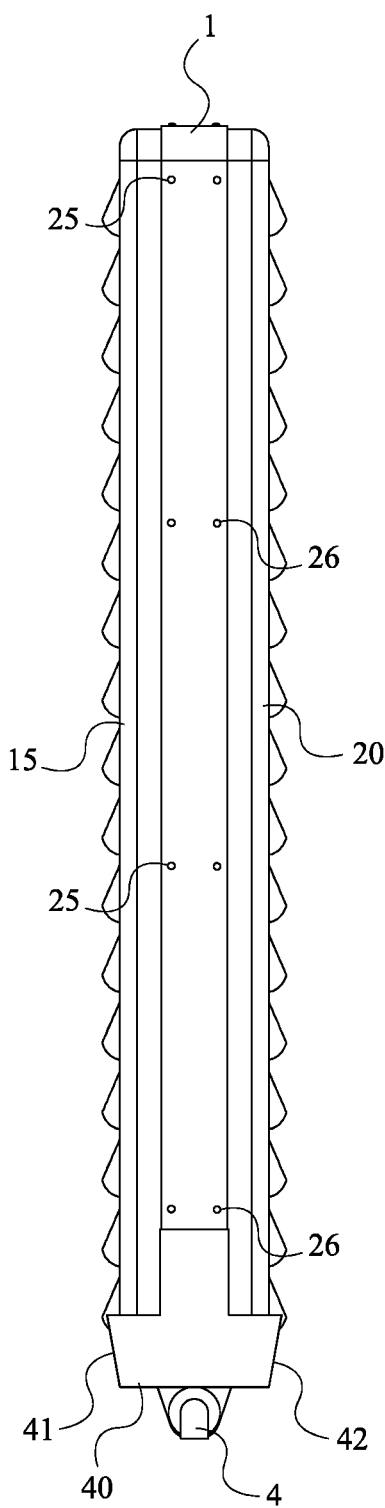
FIG. 4 is a right side elevational view of the present invention in the preferred embodiment.
Figure 5:
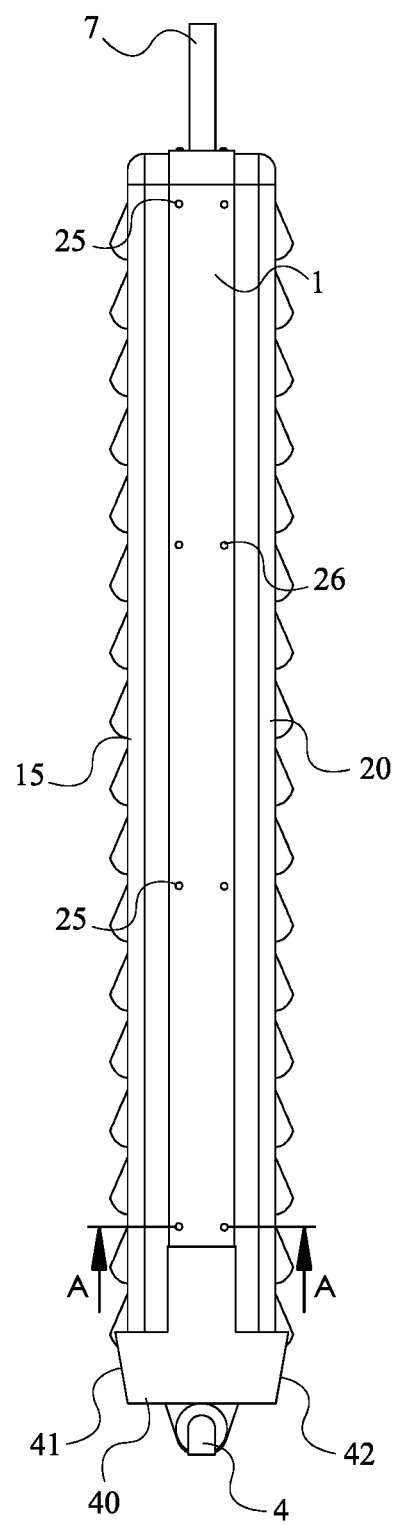
FIG. 5 is a right side elevational view of the present invention in the preferred embodiment, wherein the plurality of supply tubes is positioned into the enclosure.

In reference to FIG. 4-5, in one embodiment, the first lateral wall 41 is angularly offset from the first pane 15, while the second lateral wall 42 is angularly offset from the second pane 20. The first lateral wall 41 and the second lateral wall 42 are angled from the bottom of the drain tray 40, such that a gap is formed between the top of the first lateral wall 41 and the first pane 15 and a gap is formed between the top of the second lateral wall 42 and the second pane 20. Preferably, the first lateral wall 41 is angularly offset from the first pane 15 by 10 degrees, while the second lateral wall 42 is angularly offset from the second pane 20 by 10 degrees; however, the degree to which the first lateral wall 41 and second lateral wall 42 are angularly offset from the first pane 15 and the second pane 20, respectively, may vary between embodiments.

The offset nature of the first lateral wall 41 and the second lateral wall 42 allow the first pane 15 and the second pane 20, respectively, to be easily removed from the perimeter frame 1, without having to detach the drain tray from the perimeter frame 1. To uninstall the first pane 15, each of the first plurality of pins 25 is first removed. The first pane 15 is then pulled from the first channel 23, wherein the top of the first pane 15 is extracted first. As the first pane 15 is pulled out of the first channel 23, the first pane 15 is angled out and downward from the perimeter frame 1. Because the first lateral wall 41 is angularly offset, the first pane 15 is able to rotate in such a manner. Once the first pane 15 has been rotated down and out, the first pane 15 can be pulled up and out of the drain tray 40.

Similarly, to uninstall the second pane 20, each of the second plurality of pins 26 is first removed. The second pane 20 is then pulled from the second channel 24, wherein the top of the second pane 20 is extracted first. As the second pane 20 is pulled out of the second channel 24, the second pane 20 is angled out and downward from the perimeter frame 1. Because the second lateral wall 42 is angularly offset, the second pane 20 is able to rotate in such a manner. Once the second pane 20 has been rotated down and out, the second pane 20 can be pulled up and out of the drain tray 40.

In one embodiment, the perimeter frame 1 is a thin-walled structure that comprises a perimetric lip 10 and a seat 14. A left side wall, a top wall, a right side wall, and a bottom wall form the rectangular structure of the perimeter frame 1; the left side wall and the right side wall being longer than the top wall and the bottom wall. The perimetric lip 10 extends inwards and traverses along three walls of one side of the perimetric frame; the left side wall, the top wall, and the right side wall. The first pane 15 is adjacently connected to the perimeter frame 1 opposite the perimetric lip 10, wherein the first pane 15 forms the front side of the grow plant enclosure; the perimetric lip 10 being positioned around the back side.

The perimetric lip 10 delineates an access opening 31 into which the second pane 20 is positioned in order to seal the grow panel enclosure shut, as depicted by FIGS. 12A-B and FIGS. 13A-B. The second pane 20 is adjacently connected to the perimeter frame 1 and is positioned into the access opening 31. The second pane 20 engages the perimetric lip 10 to form a watertight seal between the perimeter frame 1 and the second pane 20. The second pane 20 comprises a pane inset 21 and a perimetric flange 22; the perimetric flange 22 being positioned adjacent to the perimetric lip 10. The perimetric flange 22 is an extension traversing around the second pane 20 that prevents the second pane 20 from being entirely positioned within the perimeter frame 1, wherein the perimetric flange 22 is supported by the perimetric lip 10.

Figure 13A:
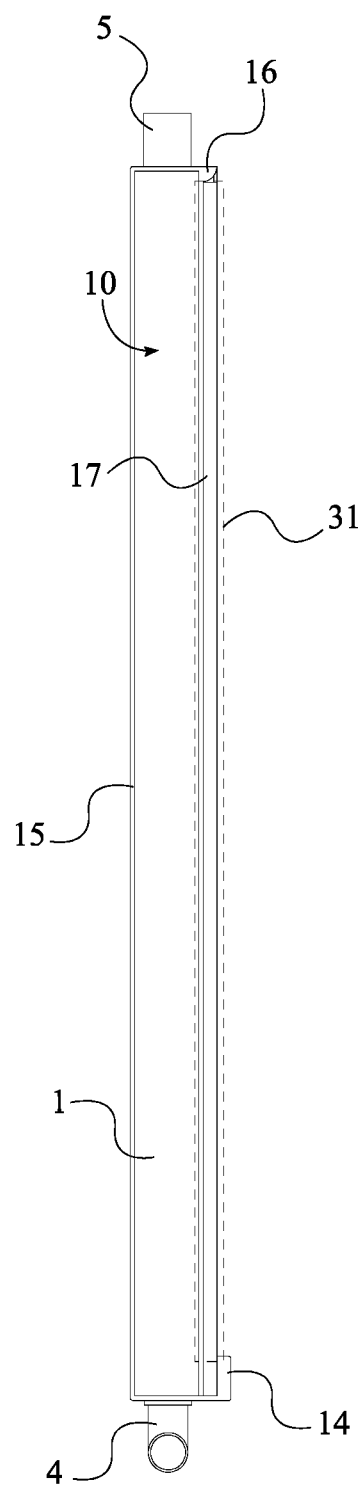
FIG. 13A is a right side sectional view of the first pane and the perimeter frame in an alternative embodiment, wherein the access opening is outlined.
Figure 13B:
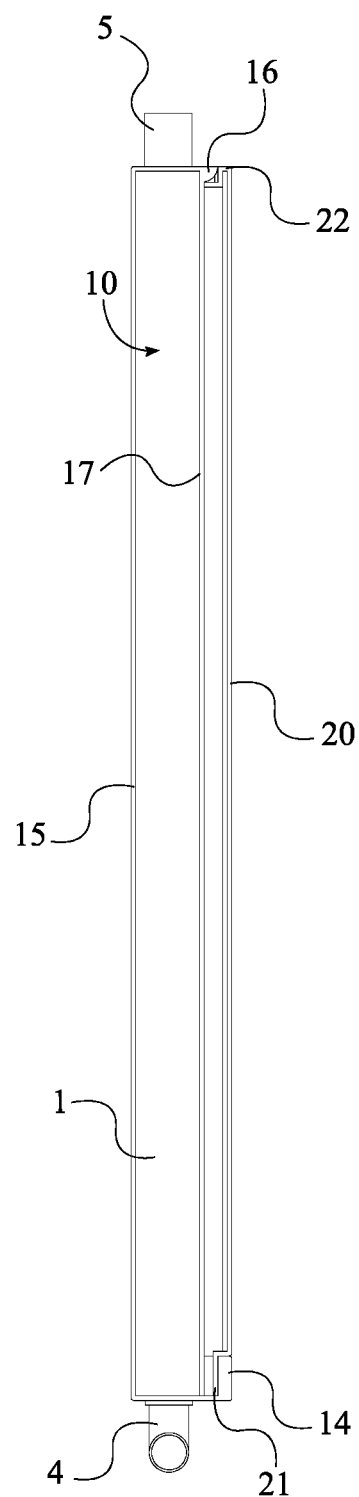
FIG. 13B is a right side sectional view of an alternative embodiment, wherein the second pane is positioned into the access opening.

In reference to FIG. 13A-B, the perimetric lip 10 comprises a curved edge 16 and a pair of stops 17. The curved edge 16 is positioned in between the pair of stops 17, along the top wall of the perimeter frame 1 and is positioned perpendicular to the pair of stops 17. Each of the pair of stops 17 is positioned along either the left side wall or the right side wall of the perimeter frame 1. The pair of stops 17 prevents the second pane 20 from traversing all the way into the perimeter frame 1, providing a surface onto which the second pane 20 is positioned. The curved edge 16 facilitates the insertion and removal of the second pane 20, allowing the second pane 20 to be angled and slid into place. As the pane inset 21 is positioned into the bottom of the perimeter frame 1, the curved edge 16 allows the top of the second pane 20 to slide into place within the access opening 31.

Figure 12A:
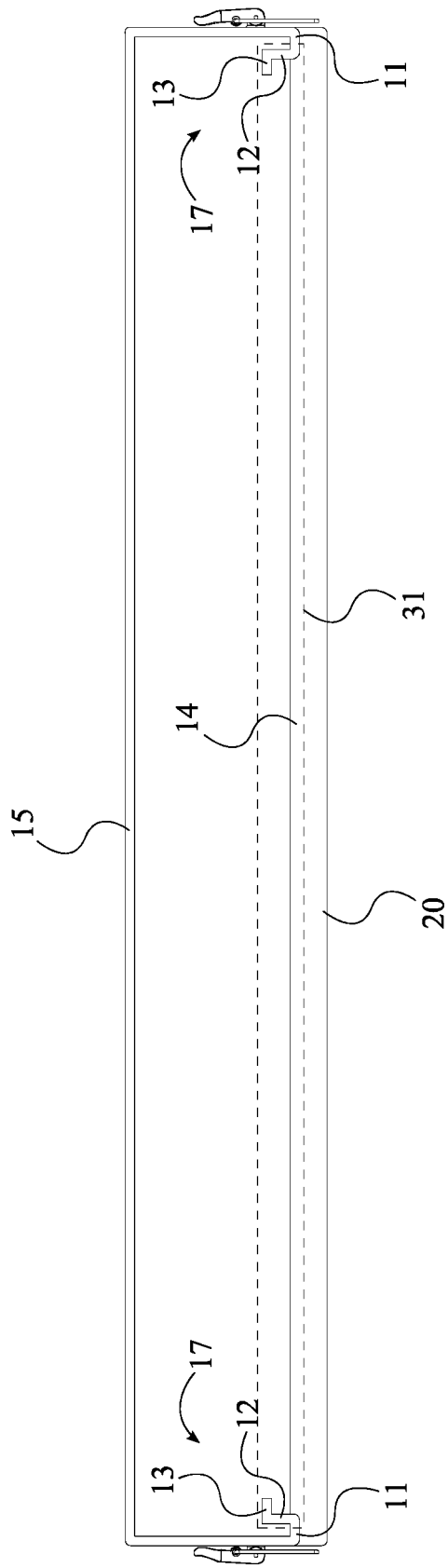
FIG. 12A is a top sectional view of the first pane and the perimeter frame in an alternative embodiment, wherein the access opening is outlined.
Figure 12B:
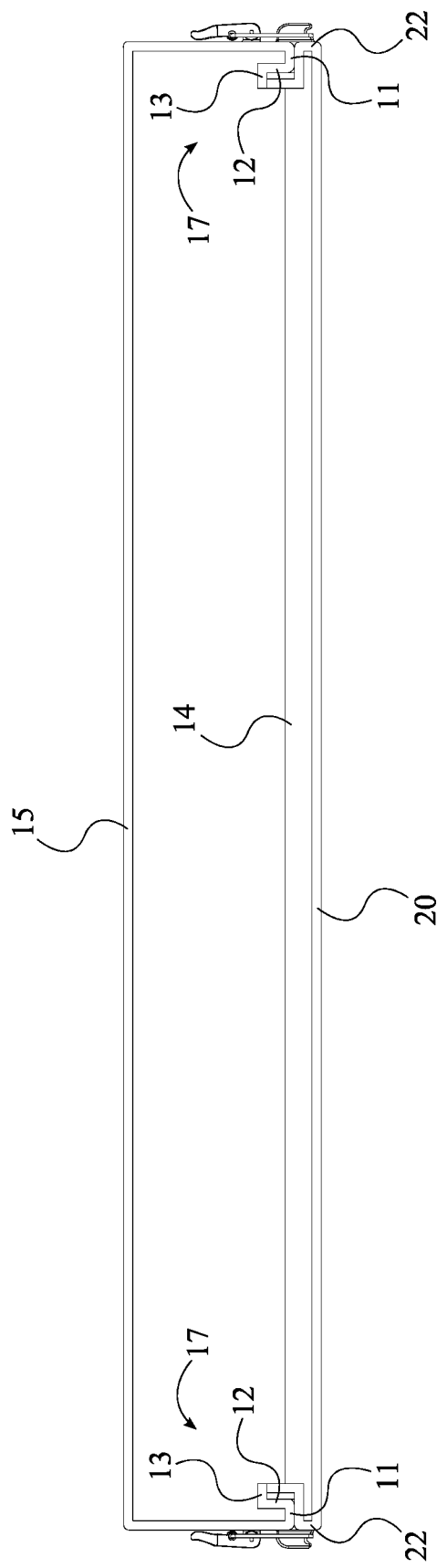
FIG. 12B is a top sectional view of an alternative embodiment, wherein the second pane is positioned into the access opening.

In reference to FIG. 12A-B, in one embodiment of the present invention, each of the pair of stops forms a z-like shape having a first segment 11, a second segment 12, and a third segment 13. The first segment 11 is positioned around the back side and projects into the perimeter frame 1, being perpendicular to the left side wall, the top wall, and the right side wall. The second segment 12 is terminally and perpendicularly connected to the first segment 11, wherein the second segment 12 is directed inwards, towards the front side of the perimeter frame 1. The third segment 13 is terminally connected to the second segment 12 opposite the first segment 11, wherein the third segment 13 is parallel to the first segment 11 and is directed inwards of the perimeter frame 1 from the second segment 12. The second pane 20 is positioned into the perimeter frame 1, flush against the third segment 13, while the perimetric flange 22 is positioned flush against the first segment 11.

Figure 14:
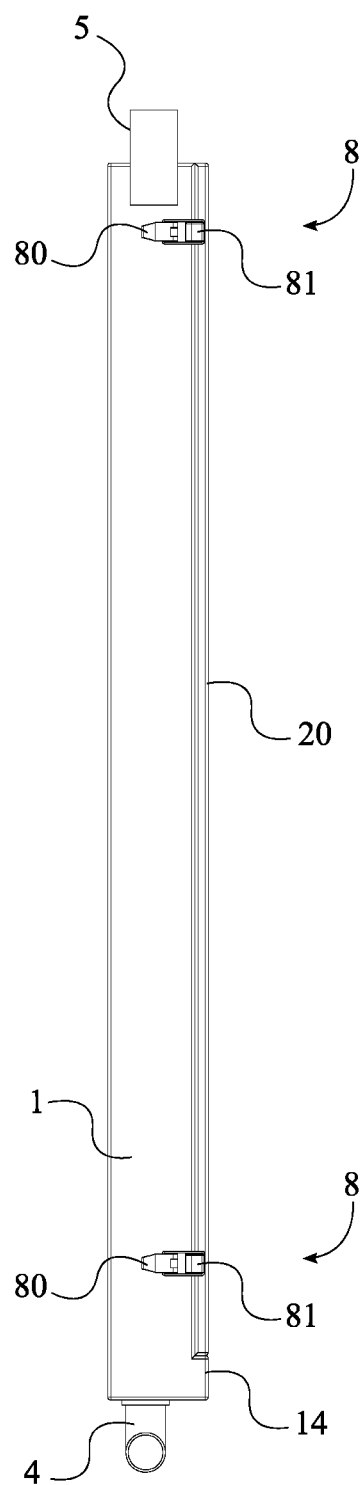
FIG. 14 is a right side view of the present invention in an alternative embodiment, wherein the latch is connected to the perimeter frame and the keeper is connected to the second pane.

In reference to FIG. 13B and FIG. 14, the seat 14 is positioned adjacent to the perimetric lip 10 opposite the first pane 15, wherein the seat 14 forms an extrusion about the back side of the perimeter frame 1. The seat 14 is terminally positioned about the perimeter frame 1, wherein the seat 14 blocks off a portion of the open back side of the perimeter frame 1. Furthermore, the seat 14 provides a base for supporting the second pane 20. When the second pane 20 is positioned into the perimeter frame 1, a portion of the perimeter frame 1 adjacent to the pane inset 21 is positioned onto the seat 14. The pane inset 21 is terminally positioned along the second pane 20, wherein the pane inset 21 is positioned across the bottom of the second pane 20. The pane inset 21 helps guide the second pane 20 into the perimeter frame 1 and is positioned within the access opening 31 adjacent to the seat 14 when the second pane 20 is attached to the perimeter frame 1.

Figure 15:
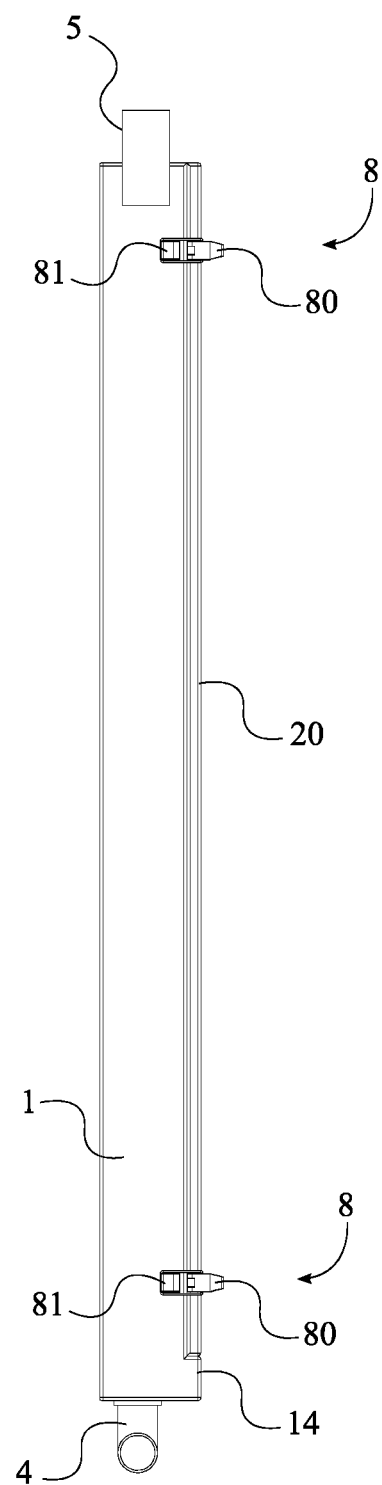
FIG. 15 is a right side view of the present invention in an alternative embodiment, wherein the latch is connected to the second pane and the keeper is connected to the perimeter frame.

In reference to FIG. 14-15, in some embodiments, the second pane 20 is attached to the perimeter frame 1 by a plurality of latch assemblies 8, wherein the second pane 20 can be removed in order to access the interior of the grow panel enclosure. As such, each of the plurality of latch assemblies 8 is adjacently connected to both the perimeter frame 1 and the second pane 20. Each of the plurality of latch assemblies 8 comprises a latch 80 and a keeper 81; the latch 80 being adjacently connected to the perimeter frame 1 and the keeper 81 being adjacently connected to the second pane 20 as shown in FIG. 14, or the latch 80 being adjacently connected to the second pane 20 and the keeper 81 being adjacently connected to the perimeter frame 1 as shown in FIG. 15. The latch 80 engages the keeper 81 in order to bind the second pane 20 to the perimeter frame 1, wherein the perimeter frame 1 and the second pane 20 form a watertight seal with each other.

The plurality of latch assemblies 8 can be any type of two piece locking mechanism that is able to temporarily secure the second pane 20 to the perimeter frame 1. Such two piece locking mechanisms may include, but are not limited to, draw latches, compression latches, or cam locks. In other embodiments of the present invention, each of the plurality of latch assemblies 8 may be a single piece latch, such as a screw that traverses through the second pane 20 and into the perimeter frame 1.

Preferably, the perimeter frame 1, the first pane 15, and the second pane 20 are constructed from a non-corrosive material, such as food grade plastic, to ensure the longevity of the grow panel enclosure, however, it is possible for other materials to be used. The use of food grade plastic also ensures that the grow panel enclosure meets material standards for use with food. In one embodiment of the present invention, the perimeter frame 1 and the first pane 15 are a single piece of material that is formed through rotational molding, while the second pane 20 is a separate single piece also formed through rotational molding. In other embodiments of the present invention, the perimeter frame 1, the first pane 15, and the second pane 20 may be formed in different ways and may be assembled and held together by either mechanical means such as self-tapping screws or by means of nuts and bolts through pre-drilled holes in the frame pieces, or by chemical means such as an adhesive.

The plurality of plug holder openings 30 provides a means for imbedding a plurality of plant holders 9 within the first pane 15 and the second pane 20. The plurality of plug holder openings 30 can be designed in any shape or size in order to coincide with the shape of each of the plurality of plant holders 9 being used to grow plants. For example, in one embodiment of the present invention, each of the plurality of plug holder openings 30 is circular and depressed in order to receive the plurality of plant holders 9 being common plastic plant baskets that hold sprouted plants for growth through maturity and harvest time.

Figure 2:
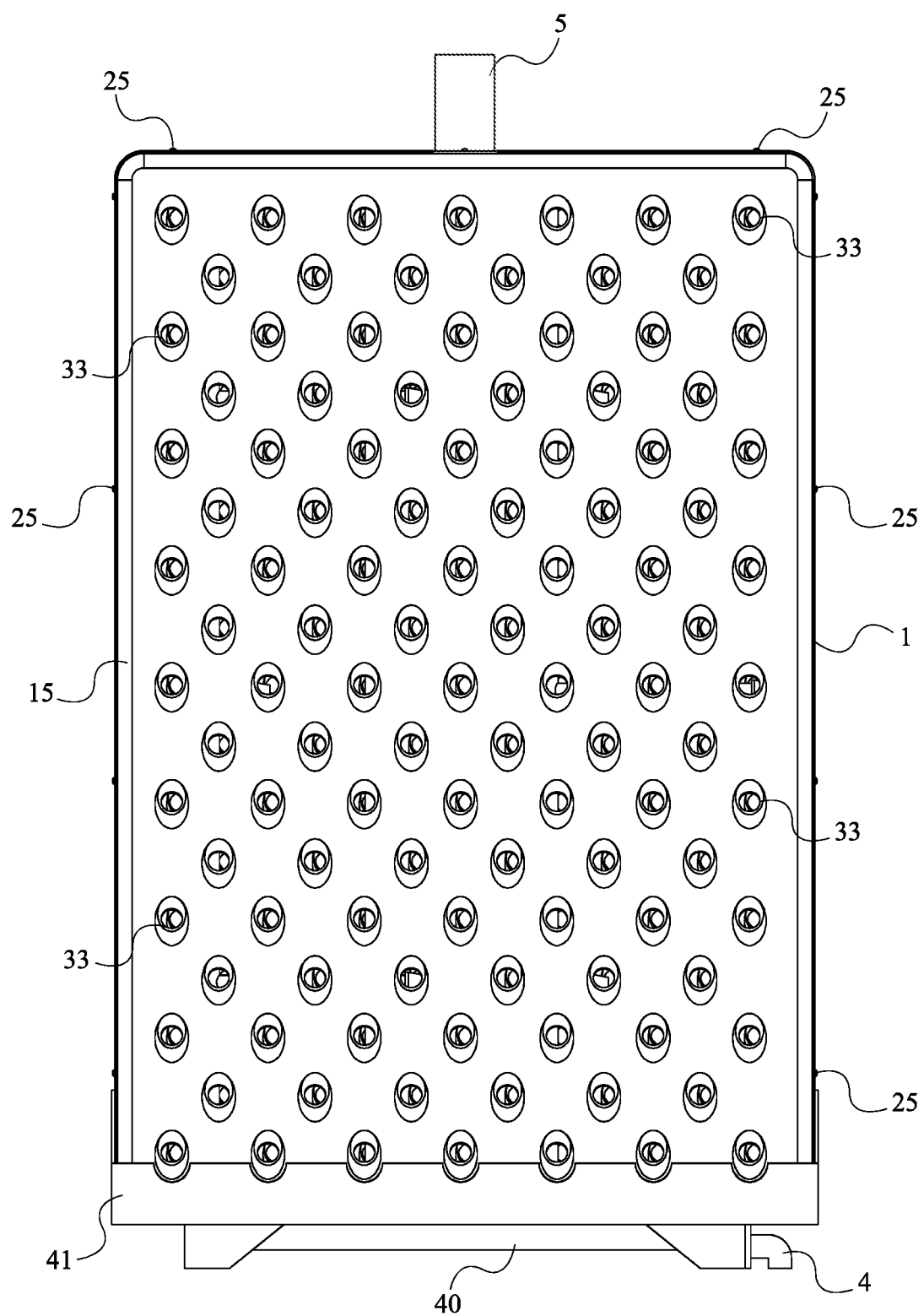
FIG. 2 is a front elevational view of the present invention in the preferred embodiment.
Figure 3:
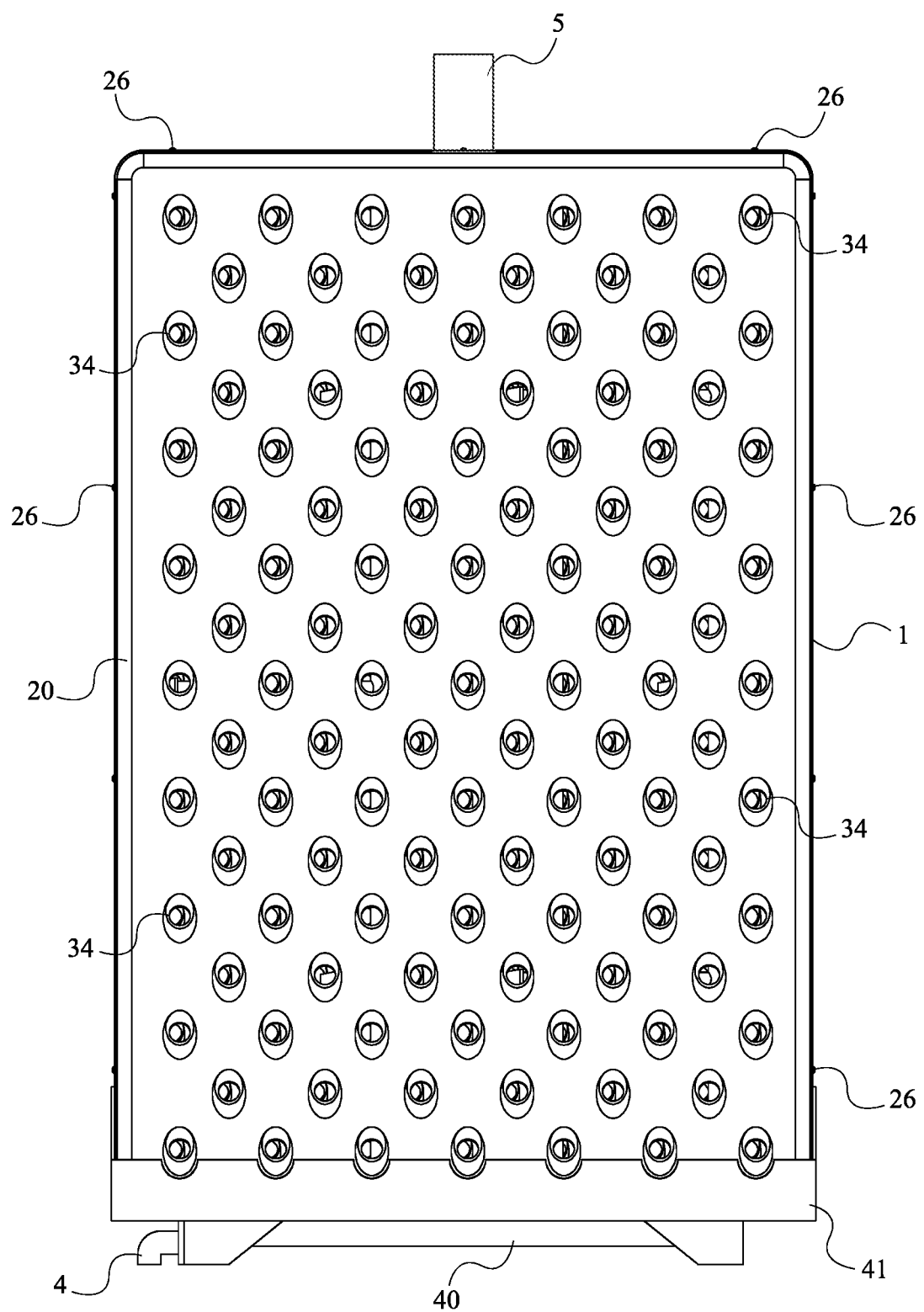
FIG. 3 is a rear elevational view of the present invention in the preferred embodiment.

In reference to FIG. 2-3, the plurality of plug holder openings 30 comprises a first plurality of plug holder openings 33 and a second plurality of plug holder openings 34. Each of the first plurality of plug holder openings 33 traverses through the first pane 15, while each of the second plurality of plug holder 34 openings traverses through the second pane 20. The first plurality of plug holder openings 33 and the second plurality of plug holder openings 34 allow plants to be grown on both sides of the grow panel enclosure, thus increasing the plant density in a growing area.

Figure 16:
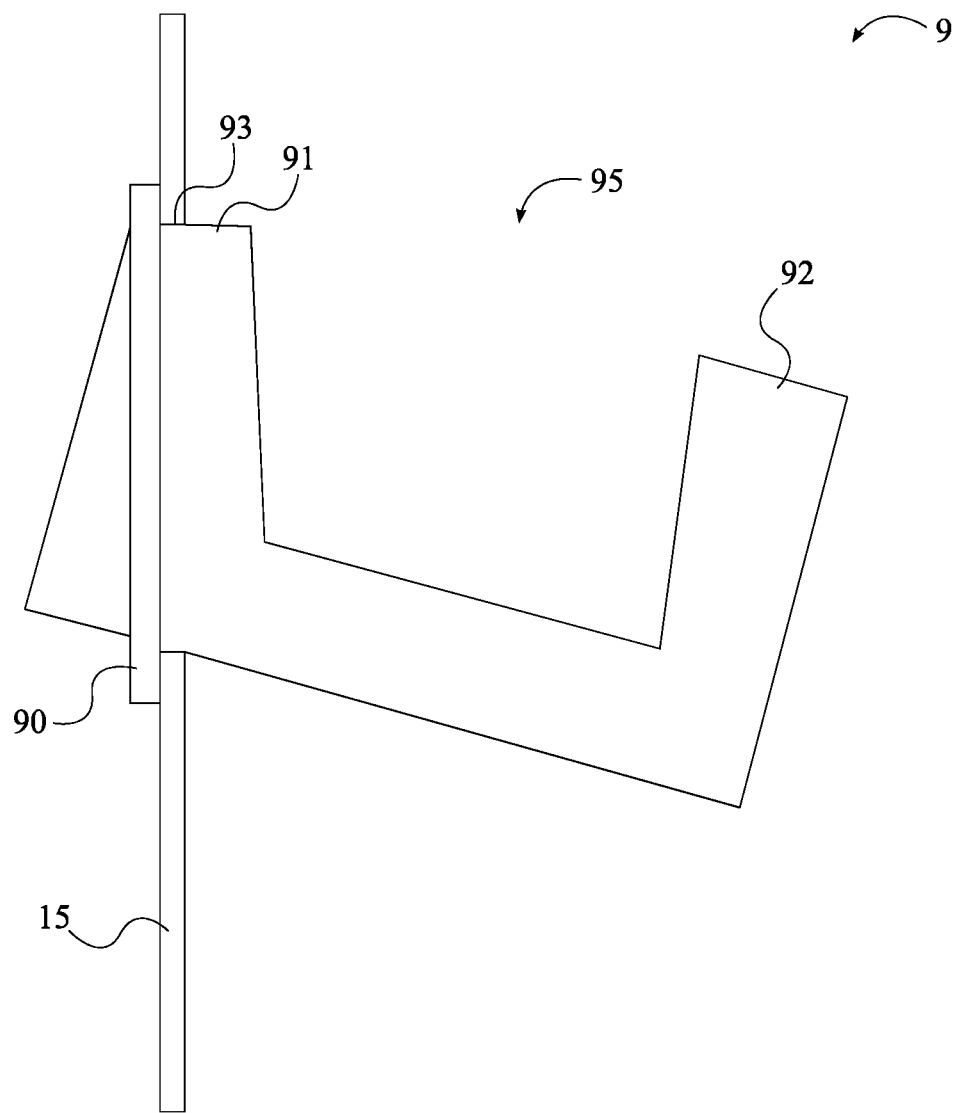
FIG. 16 is a right side sectional view of the present invention in an alternative embodiment, wherein a plant holder is positioned through the first pane.
Figure 17:
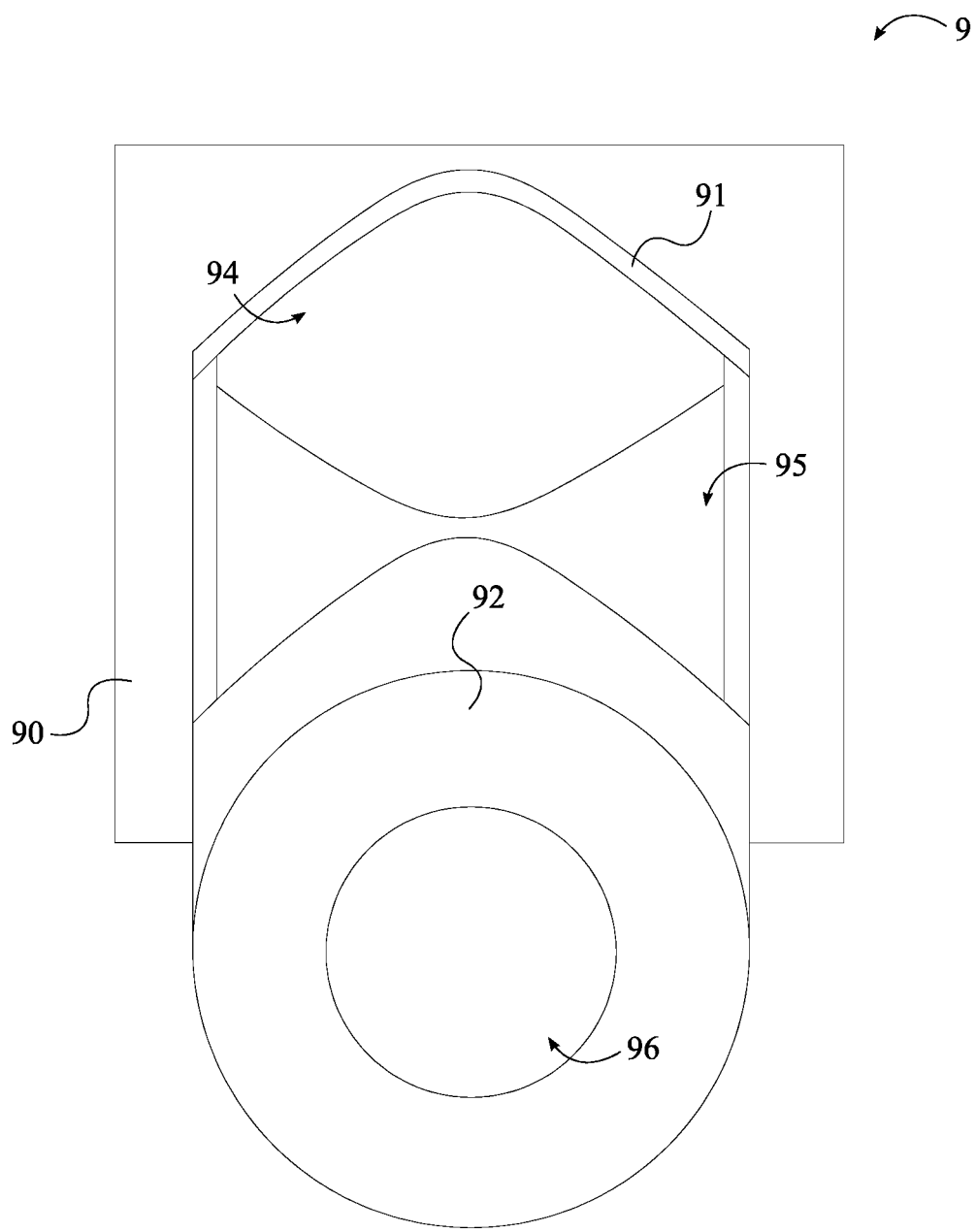
FIG. 17 is a rear elevational view of the plant holder.

In reference to FIG. 16-17, in one embodiment of the present invention, each of the plurality of plant holders 9 comprises a face plate 90, a retention ledge 91, an anti-tilt lip 92, panel mating surface 93, a plant access opening 94, a first nutrient opening 95, a second nutrient opening 96. Additionally, each of the plurality of plug holder openings 30 is square shaped in order to receive one of the plurality of plant holders 9. Each of the plurality of plant holders 9 is externally inserted through the first pane 15 or the second pane 20, wherein the face plate 90 is positioned flush against the first pane 15 or the second pane 20, preventing each pf the plurality of plug holders from being fully inserted through the first pane 15 or the second pane 20. The panel mating surface 93 is positioned adjacent to the face plate 90, and is the portion of each of the plurality of plant holders 9 that contacts the surface of the first pane 15 or the second pane 20 delineated by the plurality of plug holder openings 30.

In reference to FIG. 16, the retention ledge 91 is positioned adjacent to the panel mating surface 93 opposite the face plate 90 and extends into the perimeter frame 1, perpendicular to the first pane 15 or the second pane 20 to prevent each of the plurality of plant holders 9 from tipping and falling out of the first pane 15 or the second pane 20. Furthermore, the anti-tilt lip 92 is terminally positioned from the retention ledge 91, wherein the anti-tilt lip 92 is positioned within the perimeter frame 1 and provides additional weight to prevent the plant holder from tipping and falling out. Additionally, each of the plurality of plant holders 9 is angled, wherein the anti-tilt lip 92 is positioned downwards within the perimeter frame 1. The angle of each of the plurality of plant holders 9 not only assists in preventing the plurality of plant holders 9 from falling out, but also angles the growing plants, such that the growing plants grow out and upwards from each of the plurality of plant holders 9.

In reference to FIG. 17, the plant access opening 94 is positioned adjacent to the face plate 90 opposite the panel mating surface 93, wherein the plant access opening 94 provides a means for inserting and removing a plant, in addition to providing an opening through which the plant can grow. The first nutrient opening 95 is positioned in between the retention ledge 91 and the anti-tilt lip 92, and is an opening in the plant holder that allows nutrient solution to be supplied to the plant within the plant holder. The second nutrient opening 96 traverses through the anti-tilt lip 92 and provides further access to the plant in order to supply the plant with nutrient solution. Together, the first nutrient opening 95 and the second nutrient opening 96 provide the plant with maximum exposure to the nutrient solution that is aeroponically delivered, while still providing the plant holder with sufficient means for retaining the plant. When employed in an optimum timed manner, such aeroponic nutrient application to the root zone allows a plant to grow much faster than is otherwise possible in other forms of plant cultivation.

Preferably, each of the plurality of pant holders is constructed from a non-corrosive material to ensure the longevity of the plurality of plant holders 9, however, it is possible for other materials to be used. In traditional aeroponic and hydroponic plant cultivation, disposable baskets are utilized for retaining and growing plants. The plurality of plant holders 9 eliminates the use of disposable baskets, thus reducing operational costs. Furthermore, the plurality of plant holders 9 provides for a reduction in labor time associated with inserting the sprouted plants, and harvesting of the plants when mature, when compared to other known vertical growing devices.

Figure 6:
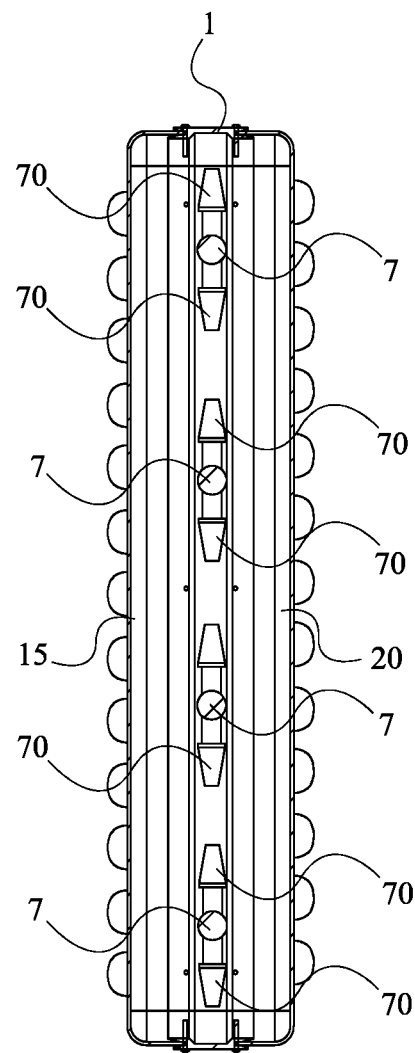
FIG. 6 is a cross sectional view taken along line A-A of FIG. 5.
Figure 18:
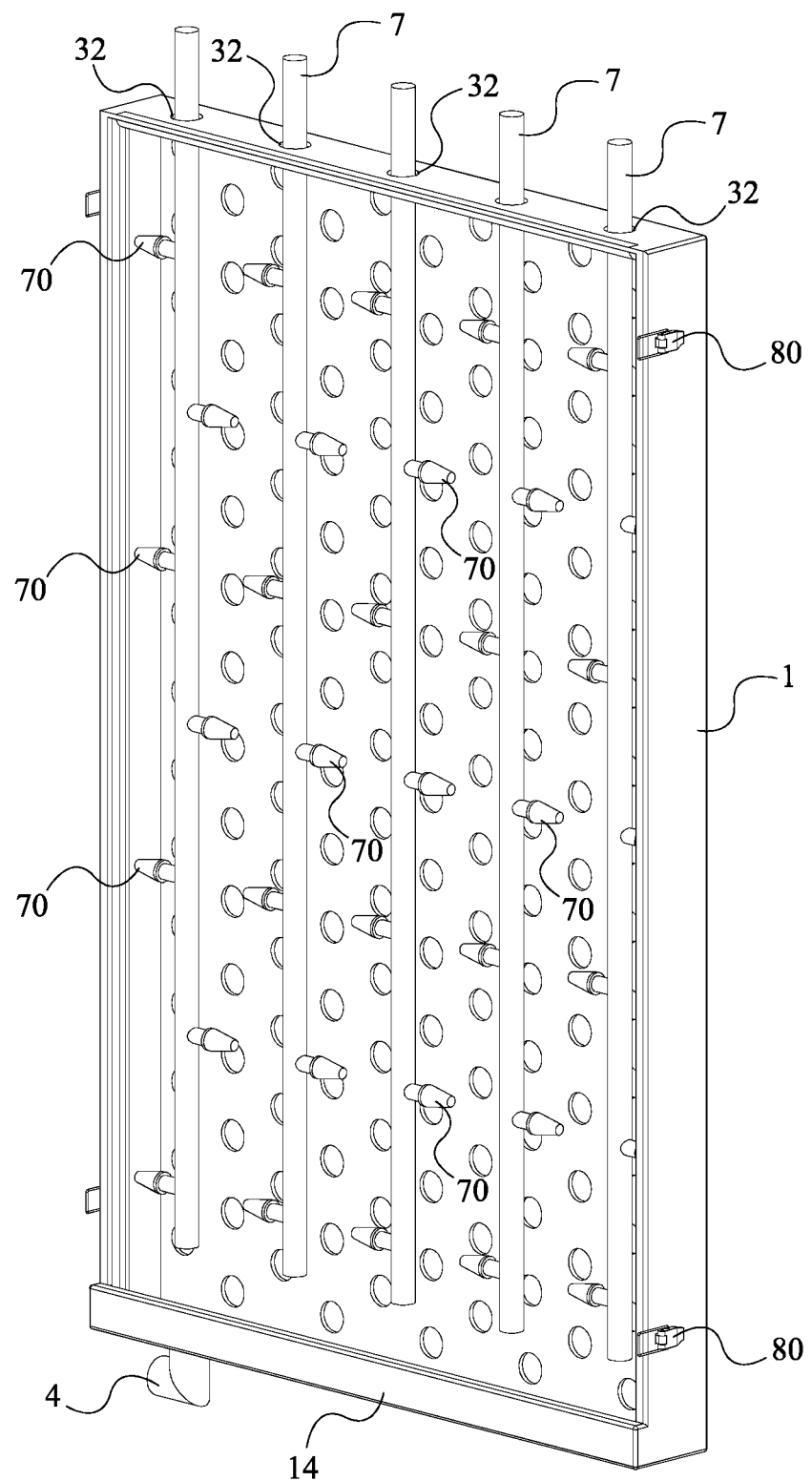
FIG. 18 is a rear perspective view of an alternative embodiment, wherein the plurality of supply tubes is positioned within the perimeter frame through the plurality of supply tube openings.

In reference to FIG. 18, a plurality of supply tube openings 32 traverses through the perimeter frame 1 and allows a plurality of supply tubes 7 to be positioned within the enclosure formed by the first pane 15, the second pane 20, and the perimeter frame 1. When the grow panel enclosure is positioned vertically, each of the plurality of supply tube openings 32 traverses through the top wall. The plurality of supply tubes 7 traverses through the plurality of supply tube openings 32, wherein each of the plurality of supply tubes 7 is positioned within the perimeter frame 1, between the first pane 15 and the second pane 20. Each of the plurality of supply tubes 7 comprises a plurality of spray nozzles 70, wherein the plurality of spray nozzles 70 is positioned along the plurality of supply tubes 7. The plurality of spray nozzles 70 is positioned adjacent to the first plurality of plug holder openings 33 and the second plurality of plug holder openings 34, as shown in FIG. 6, wherein nutrient solution is delivered through the plurality of supply tubes 7 and then directed to the roots of the plants through the plurality of spray nozzles 70. This provides a uniform and reliable nutrient saturation to the root zone of each plant supported by the grow panel enclosure.

Figure 9:
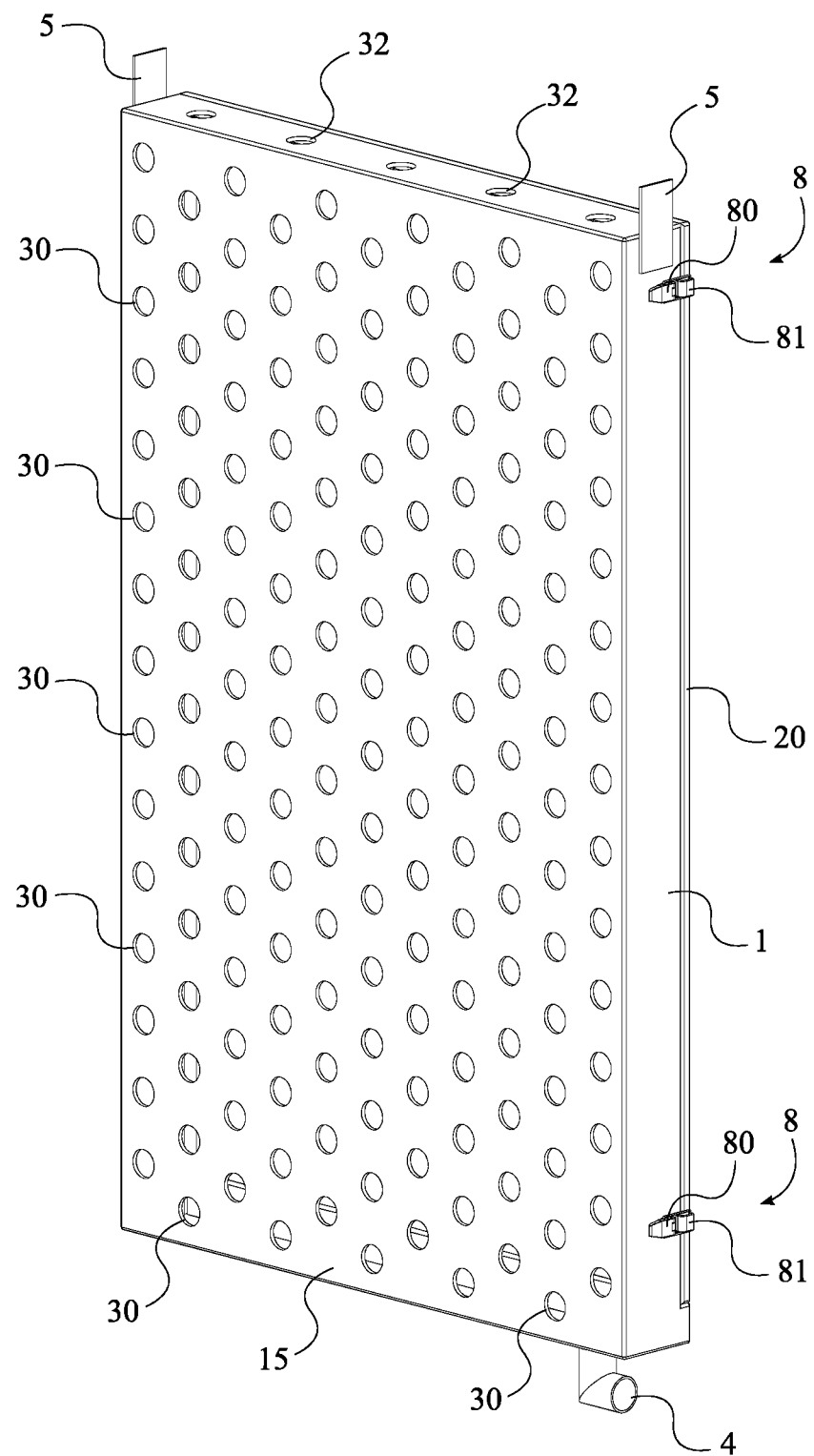
FIG. 9 is a perspective view of the present invention in an alternative embodiment.
Figure 10:
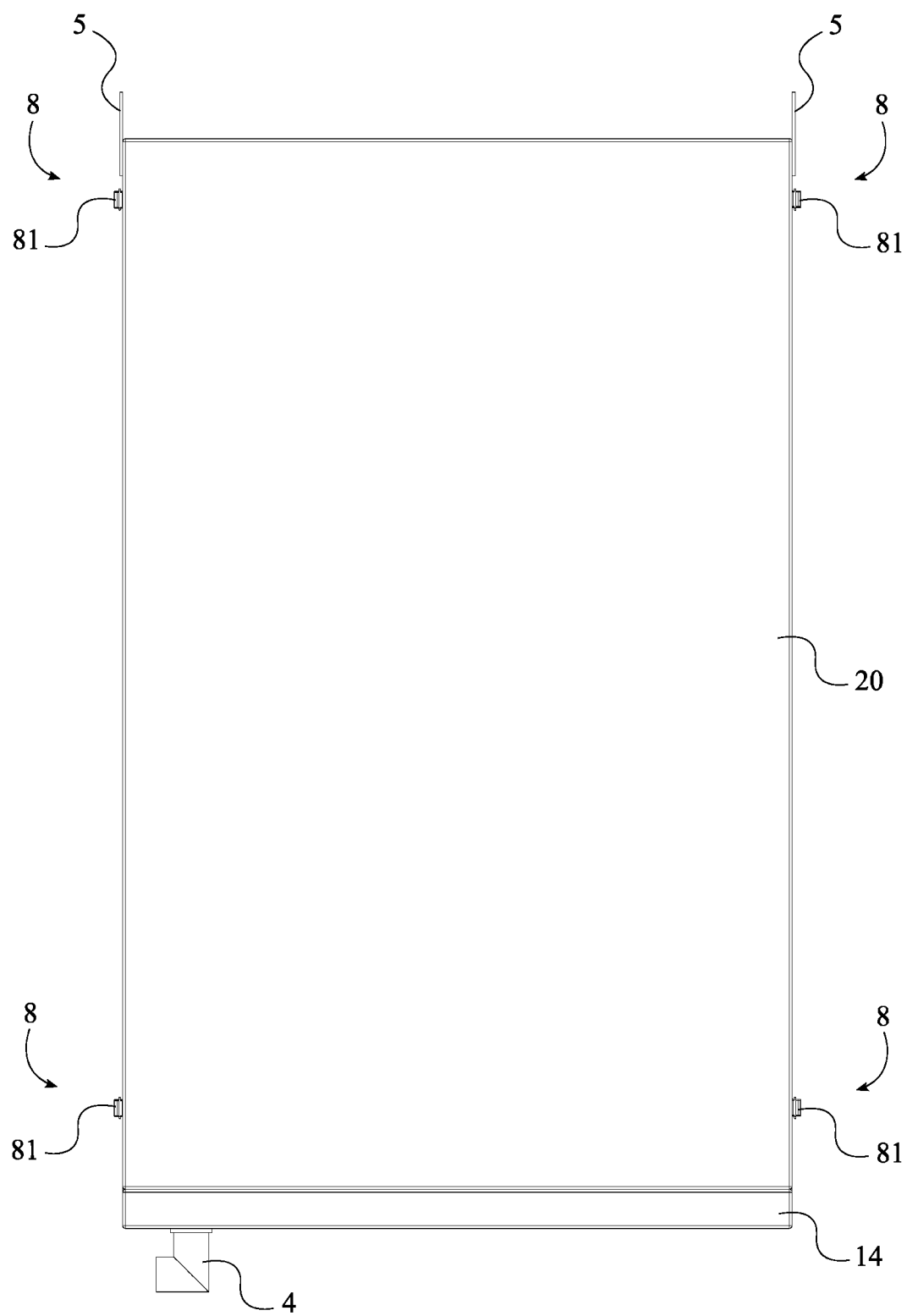
FIG. 10 is a rear elevational view of the present invention in an alternative embodiment.
Figure 11:
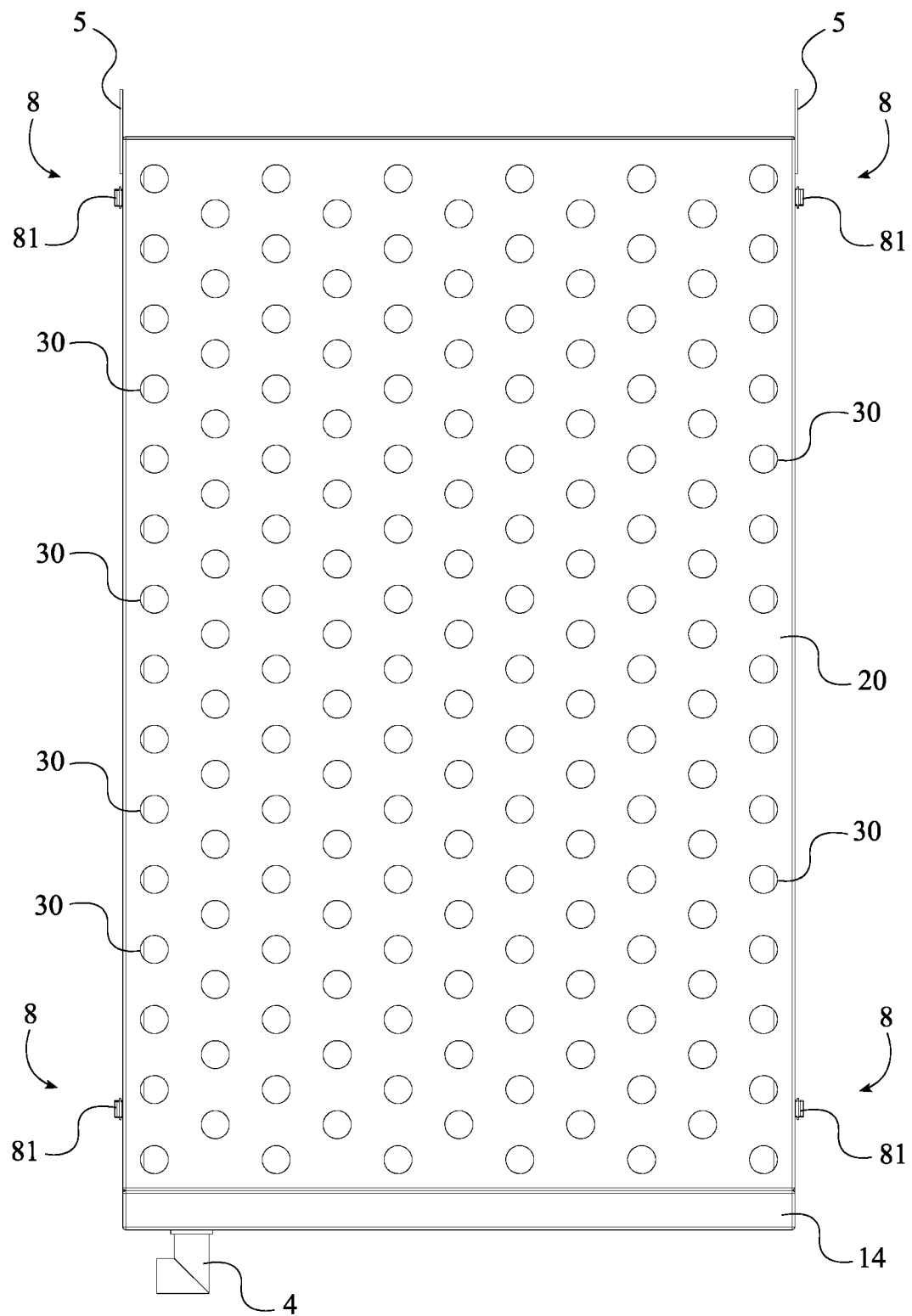
FIG. 11 is a rear elevational view of the present invention in an alternative embodiment, wherein the plurality of plug holder openings traverses through the second pane.
Figure 21:
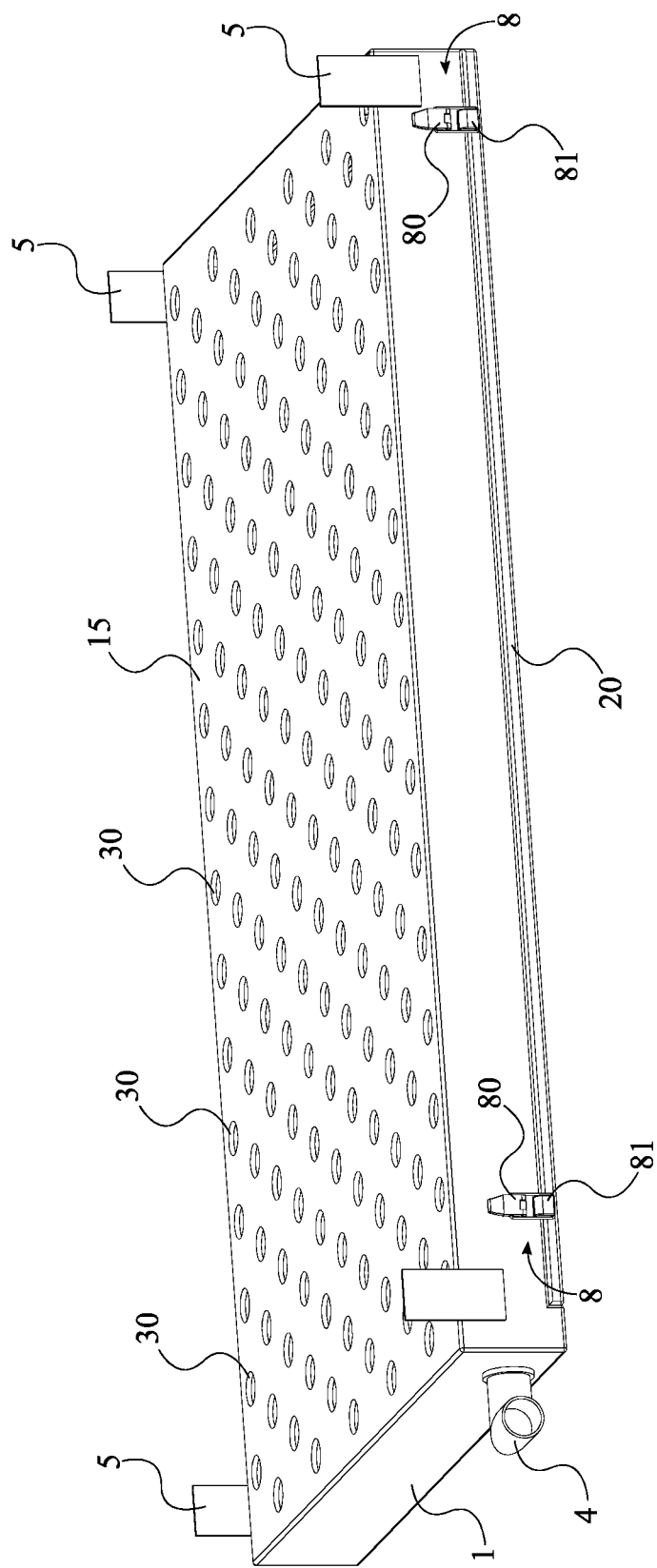
FIG. 21 is a perspective view of an alternative embodiment, wherein the present invention is oriented in the horizontal position.

The drain fixture 4 is adjacently connected to the perimeter frame 1 and is used to remove excess nutrient solution from the grow panel enclosure. As such, the drain fixture 4 is positioned about the bottom of the perimeter frame 1, and may additionally be angled downward, in order to facilitate the drainage of the nutrient solution using gravity assistance. When the grow panel enclosure is vertically positioned, the drain fixture 4 is positioned about the perimeter frame 1 opposite the plurality of tube openings as shown in FIG. 9, or about the bottom wall of the perimeter frame 1. If the grow panel enclosure is horizontally positioned, then the drain fixture 4 is positioned about the bottom edge of the perimeter frame 1 as shown in FIG. 21. As the nutrient solution is supplied to the plants through the plurality of supply tubes 7, excess nutrient solution runs down the interior of the grow panel enclosure and collects near the drain fixture 4, wherein the drain fixture 4 allows the excess nutrient solution to be expelled from the grow panel enclosure.

Figure 8:
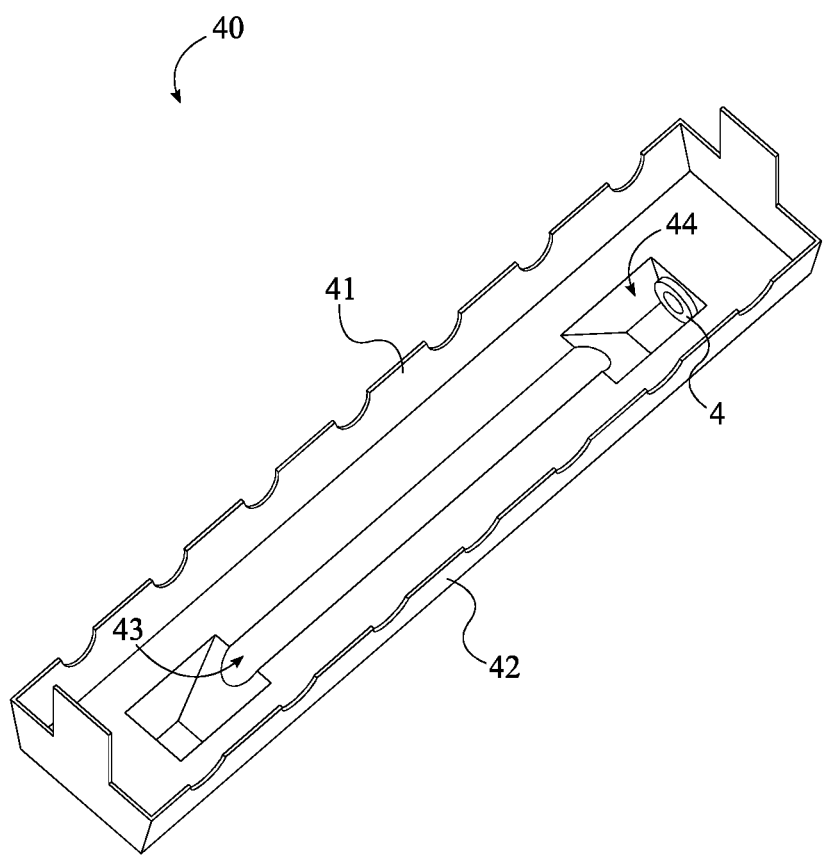
FIG. 8 is a perspective view of the drain tray.

In reference to FIG. 8, in some embodiments, a drain channel 43 and a recessed drain-mounting point 44 are formed into the drain tray 40. The drain channel 43 traverses along the drain tray 40, while the recessed drain-mounting point 44 is terminally positioned along the drain tray 40, wherein the drain channel 43 is in fluid communication with the recessed drain-mounting point 44. The drain fixture 4 is mounted into the drain tray 40; more specifically into the recessed drain-mounting point 44. In this way, excess liquid from within the enclosure formed by the first pane 15, the second pane 20, and the perimeter frame 1 is fed into the drain fixture 4 via the drain channel 43.

Figure 19:
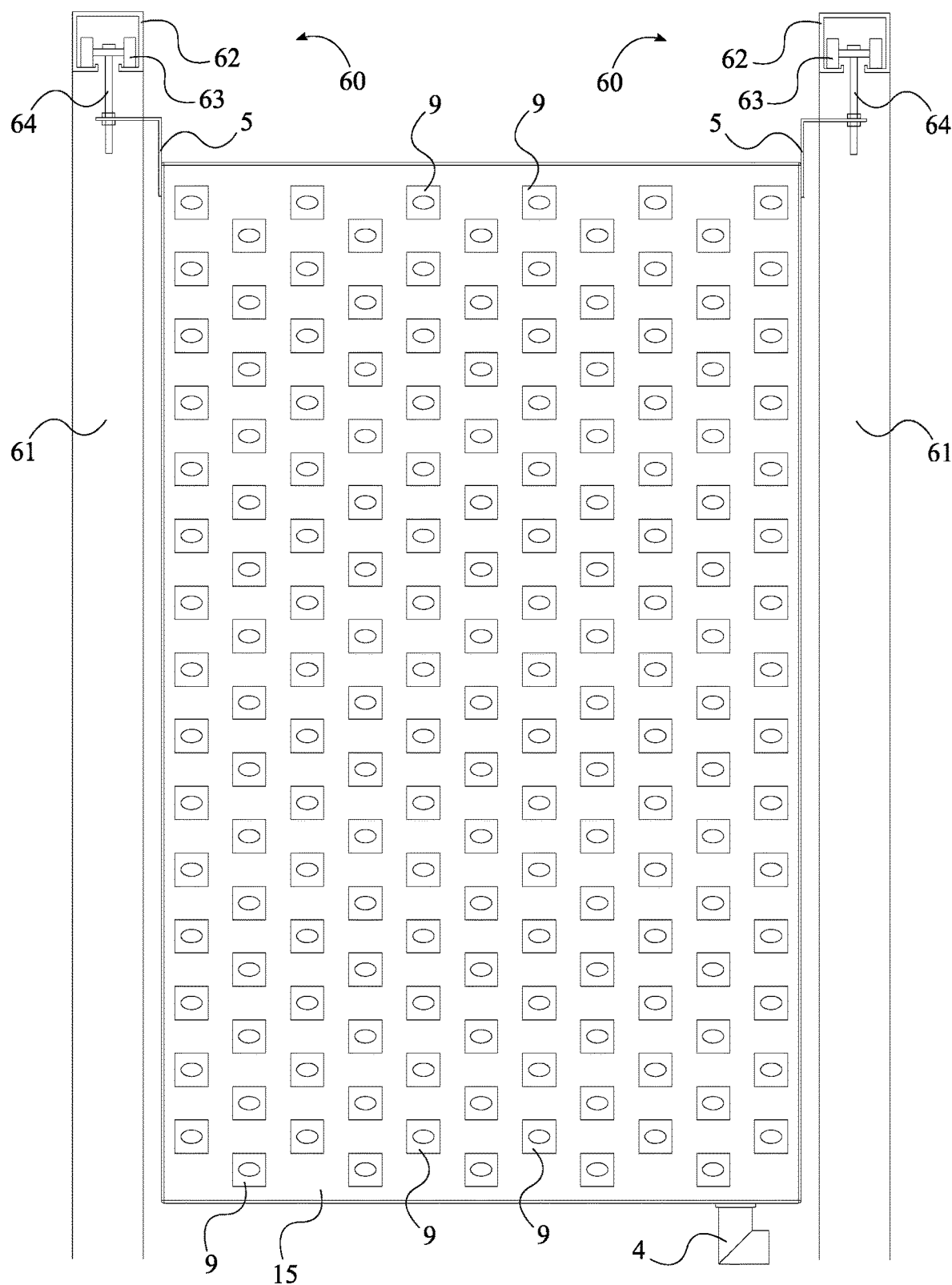
FIG. 19 is front elevational view of an alternative embodiment, wherein the perimeter frame is suspended from the grow system support structure through the pair of mounting assemblies, and wherein the plurality of plant holders is positioned within the plurality of plant holder openings.
Figure 20:
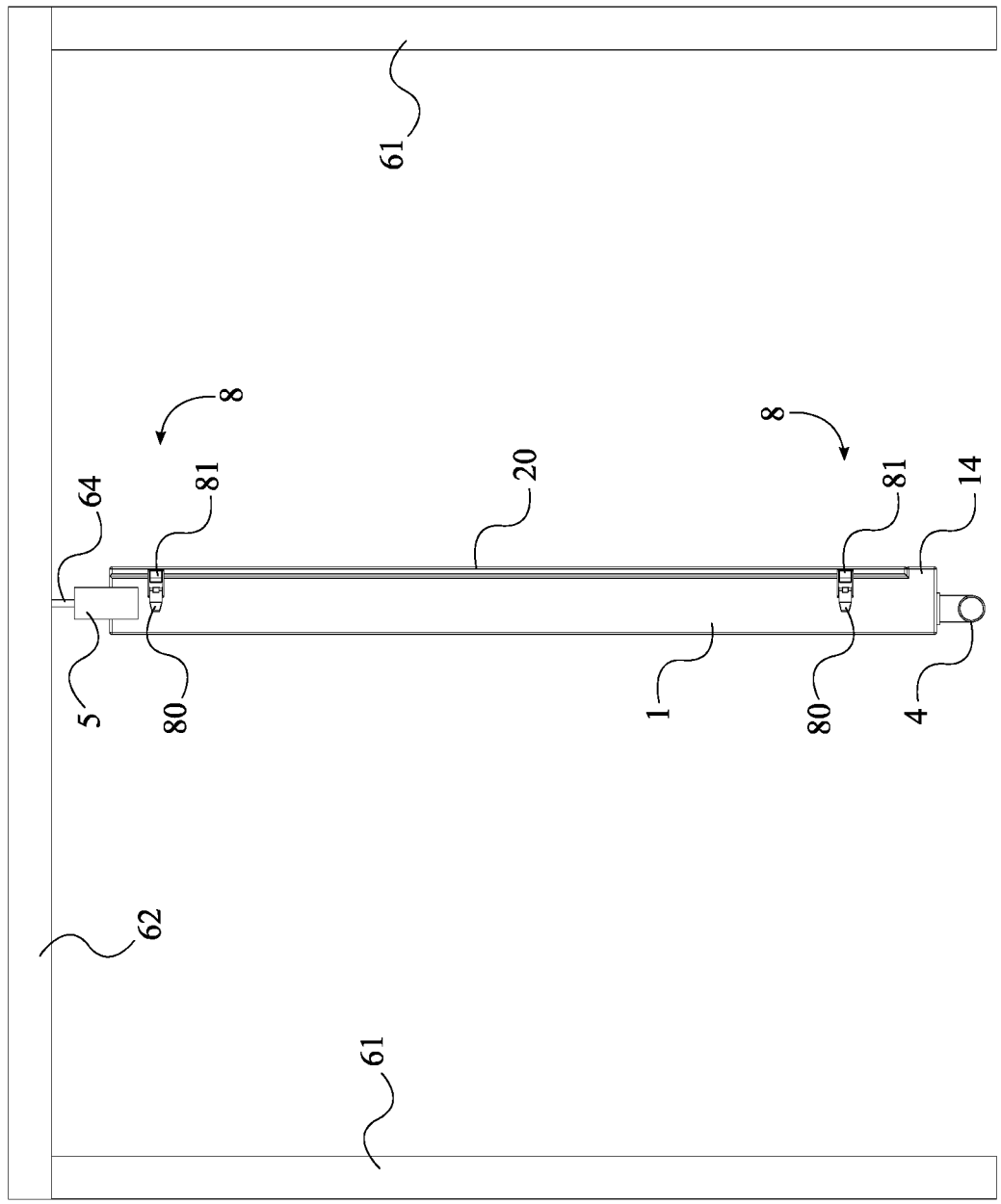
FIG. 20 is a right side elevational view of an alternative embodiment, wherein the perimeter frame is suspended from the grow system support structure and can be slidably positioned along the roller carriage channel.

In reference to FIG. 19-20, the one or more panel hangers 5 allows the perimeter frame 1 to be suspended from a grow system support structure 6. The one or more panel hangers 5 is adjacently connected to the perimeter frame 1; the location of the one or more panel hangers 5 about the perimeter frame 1 being dependent on the vertical or horizontal position of the perimeter frame 1. If the perimeter frame 1 is in the vertical position, then each of the one or more panel hangers 5 is positioned opposite the drain tray 40 (or the seat 14 depending on the embodiment) along the first pane 15 and the second pane 20; in this way, the perimeter frame 1 is suspended from the top. If the perimeter frame 1 is in the horizontal position, then the one or more panel hangers 5 is positioned both adjacent to the seat 14 and opposite the seat 14 along the perimeter frame 1 as depicted in FIG. 21; in this way, the perimeter frame 1 is supported from all four corners. In one embodiment of the present invention, each of the one or more panel hangers 5 is connected to the perimeter frame 1 by a screw, however, other methods of connection may be used in other embodiments of the present invention.

In further reference to FIG. 19-20, the grow system support comprises a pair of mounting assemblies 60 that allows a user to easily reposition the perimeter frame 1 along the grow system support structure 6. Each of the pair of mounting assemblies 60 comprises a pair of support posts 61, a roller carriage channel 62, a roller bearing hanger 63, and a panel support 64. The roller carriage channel 62 is perpendicularly connected in between the pair of support posts 61, wherein the roller carriage channel 62 is positioned parallel to a floor or ceiling. Each of the pair of support posts 61 is a vertical structure that is connected to the floor or ceiling in order to support the roller carriage channel 62.

In yet further reference to FIG. 19-20, the roller bearing hanger 63 is slidably positioned within the roller carriage channel 62, allowing for the horizontal movement of the perimeter frame 1 along the roller carriage channel 62 of each of the pair of mounting assemblies 60. The panel support 64 is adjacently connected to the roller bearing mount 63, wherein the panel support 64 hangs below the roller carriage channel 62. The perimeter frame 1 is adjacently connected to the panel support 64 of each of the pair of mounting assemblies 60 through the one or more panel hangers 5, wherein the perimeter frame 1 is suspended from the grow system support structure 6. Each of the one or more panel hangers 5 can be a strap, bracket, or any similar device that can be attached in between the perimeter frame 1 and the panel support 64 of each of the pair of mounting assemblies 60.

In one embodiment of the present invention, the roller bearing hanger 63 has a pair of roller bearings; each of the pair of roller bearings being positioned opposite each other in a U-shaped track of the roller carriage channel 62, as shown in FIG. 19. The panel support 64 is positioned in between the pair of roller bearings and is a threaded rod, wherein the one or more panel hangers 5 is positioned around the panel support 64 of each of the pair of mounting assemblies 60. A first nut and a second nut are positioned along the panel support 64, wherein each of the one or more panel hangers 5 is positioned in between the first nut and the second nut, such that the height at which the perimeter frame 1 is positioned can be adjusted by sliding the first nut and the second nut up and down along the panel support 64. In some embodiments of the present invention, the perimeter frame 1 may be directly connected to the plurality of roller bearings 60.

In addition to suspending the perimeter frame 1, the grow system support structure 6 also provides a means for supporting plumbing/nutrient delivery lines, lighting structures, ventilation fans, etc. Lighting structure, ventilation fans, etc. may be connected to the grow system support structure 6 in a fixed position, or similar to the perimeter frame 1, such structures may be slidably mounted to the grow system support structure using ball bearings. Plumbing/nutrient delivery lines can be connected along the pair of support posts 61, along the roller carriage channel 62, or in between the pair of mounting assemblies 60.

Although the invention has been explained in relation to its preferred embodiment, it is to be understood that many other possible modifications and variations can be made without departing from the spirit and scope of the invention as hereinafter claimed.

What is claimed is:

1. A grow panel enclosure comprises:
   a perimeter frame comprising a first pair of flanges, a second pair of flanges, and a mid-section;
   a drain tray being terminally connected to the perimeter frame; the first pair of flanges and the second pair of flanges being adjacently connected along the mid-section; the first pair of flanges and the second pair of flanges being positioned opposite each other, across the mid-section; the first pair of flanges forming a first channel that traverses along the mid-section; the second pair of flanges forming a second channel that traverses along the mid-section;
   a first pane being slotted into the first channel to form a continuous, watertight seal between the first pane and the perimeter frame; a second pane being slotted into the second channel to form a continuous, watertight seal between the second pane and the perimeter frame; the first pane, the second pane, and the perimeter frame being positioned into the drain tray;
   a first plurality of plug holder openings traversing through the first pane;
   a second plurality of plug holder openings traversing through the second pane;
   wherein the drain tray includes a plurality of side walls, a lower wall coupled each of the side walls and formed to include a drain channel traversing along the lower wall of the drain tray, and
   wherein an upper edge of at least one of the plurality of side walls of the drain tray is formed to include a plurality of cutouts, each cutout aligned with a portion of a plug holder opening included in the first plurality of plug holder openings or the second plurality of plug holder openings.

2. The grow panel enclosure as claimed in claim 1 comprises: a plurality of supply tubes; and the plurality of supply tubes being positioned in between the first pane and the second pane.

3. The grow panel enclosure as claimed in claim 2 comprises: each of the plurality of supply tubes comprising a plurality of spray nozzles; the plurality of spray nozzles being positioned along the plurality of supply tubes; and the plurality of spray nozzles being positioned adjacent to the first plurality of plug holder openings and the second plurality of plug holder openings.

4. The grow panel enclosure as claimed in claim 1 comprises: a plurality of plant holders; and each of the plurality of plant holders being positioned into one of the first plurality of plug holder openings or one of the second plurality of plug holder openings.

5. The grow panel enclosure as claimed in claim 4 comprises: each of the plurality of plant holders comprising a face plate, a retention ledge, an anti-tilt lip, and a panel mating surface; the panel mating surface being positioned adjacent to the face plate; the retention ledge being positioned adjacent to the panel mating surface opposite the face plate; and the anti-tilt lip being terminally positioned from the retention ledge.

6. The grow panel enclosure as claimed in claim 4 comprises: each of the plurality of plant holders comprising a face plate, a panel mating surface, a plant access opening; and the plant access opening being positioned adjacent to the face plate opposite the panel mating surface.

7. The grow panel enclosure as claimed in claim 4 comprises: each of the plurality of plant holders comprising a retention ledge, an anti-tilt lip, a first nutrient opening, and a second nutrient opening; the first nutrient opening being positioned in between the retention ledge and the anti-tilt lip; and the second nutrient opening traversing through the anti-tilt lip.

8. A grow panel enclosure comprises:
   a perimeter frame comprising a first pair of flanges, a second pair of flanges, and a mid-section;
   a drain tray being terminally connected to the perimeter frame; the first pair of flanges and the second pair of flanges being adjacently connected along the mid-section; the first pair of flanges and the second pair of flanges being positioned opposite each other, across the mid-section; the first pair of flanges forming a first channel that traverses along the mid-section; the second pair of flanges forming a second channel that traverses along the mid-section; the perimeter frame forming a left side wall, a right side wall, and a top wall interconnecting upper ends of the left side wall and the right side wall such that, when the perimeter frame is assembled, the left side wall, the right side wall, and the top wall form a continuous u-shaped structure of the perimeter frame, the left side wall, the right side wall, and the top wall each including the first pair of flanges, the second pair of flanges, and the mid-section,
   a first pane being slotted into the first channel along the left side wall, the right side wall, and the top wall; a second pane being slotted into the second channel along the left side wall, the right side wall, and the top wall; the first pane, the second pane, and the perimeter frame being positioned into the drain tray;
   a first plurality of plug holder openings traversing through the first pane;
   a second plurality of plug holder openings traversing through the second pane;
   a plurality of supply tubes; the plurality of supply tubes traversing through apertures formed in the top wall of the perimeter frame from outside the enclosure to within the enclosure to be positioned in between the first pane and the second pane, each of the plurality of supply tubes comprising a plurality of spray nozzles; the plurality of spray nozzles being positioned along the plurality of supply tubes; the plurality of spray nozzles being positioned adjacent to the first plurality of plug holder openings and the second plurality of plug holder openings.

9. The grow panel enclosure as claimed in claim 8 comprises: a first plurality of pins and a second plurality of pins; the first plurality of pins traversing through the first pair of flanges and the first pane; and the second plurality of pins traversing through the second pair of flanges and the second pane.

10. The grow panel enclosure as claimed in claim 8 comprises: the drain tray comprises a first lateral wall and a second lateral wall; the first lateral wall being angularly offset from the first pane; and the second lateral wall being angularly offset from the second pane.

11. The grow panel enclosure as claimed in claim 8 comprises: a recessed drain-mounting point being formed into the drain tray; and the recessed drain-mounting point being terminally positioned along the drain tray.

12. The grow panel enclosure as claimed in claim 11 comprises: a drain channel being formed into the drain tray; and the drain channel being in fluid communication with the recessed drain-mounting point.

13. The grow panel enclosure as claimed in claim 11 comprises: a drain fixture; and the drain fixture being mounted into the recessed drain-mounting point.

14. The grow panel enclosure as claimed in claim 8 comprises: a drain fixture; and the drain fixture being mounted into the drain tray.

15. The grow panel enclosure as claimed in claim 8 comprises: one or more panel hangers; the one or more panel hangers being adjacently connected to the perimeter frame, the one or more panel hangers being positioned opposite the drain tray, along the first pane and the second pane.

16. The grow panel enclosure as claimed in claim 15 comprises: a pair of mounting assemblies; each of the pair of mounting assemblies comprising a pair of support posts, a roller carriage channel, a roller bearing hanger coupled to the panel hanger, and a panel support; the roller carriage channel being perpendicularly connected in between the pair of support posts; the roller bearing hanger being slidably positioned within the roller carriage channel; the panel support being adjacently connected to the roller carriage channel; and the perimeter frame being adjacently connected to the panel support.

* * * * *